(12) United States Patent
Zhang et al.

(10) Patent No.: US 11,881,044 B2
(45) Date of Patent: Jan. 23, 2024

(54) METHOD AND APPARATUS FOR PROCESSING IMAGE, DEVICE AND STORAGE MEDIUM

(71) Applicant: Beijing Baidu Netcom Science and Technology Co., Ltd., Beijing (CN)

(72) Inventors: Chengquan Zhang, Beijing (CN); Mengyi En, Beijing (CN); Ju Huang, Beijing (CN); Qunyi Xie, Beijing (CN); Xiameng Qin, Beijing (CN); Kun Yao, Beijing (CN); Junyu Han, Beijing (CN); Jingtuo Liu, Beijing (CN); Errui Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 368 days.

(21) Appl. No.: 17/353,540

(22) Filed: Jun. 21, 2021

(65) Prior Publication Data
US 2021/0312174 A1 Oct. 7, 2021

(30) Foreign Application Priority Data

Dec. 22, 2020 (CN) .......................... 202011526687.4

(51) Int. Cl.
*G06V 30/414* (2022.01)
*G06T 7/136* (2017.01)
(Continued)

(52) U.S. Cl.
CPC .......... *G06V 30/414* (2022.01); *G06F 18/213* (2023.01); *G06T 7/11* (2017.01);
(Continued)

(58) Field of Classification Search
CPC ...... G06F 18/213; G06F 18/2413; G06T 7/11; G06T 7/136; G06T 2207/30176;
(Continued)

(56) References Cited

U.S. PATENT DOCUMENTS

| 2015/0039637 A1* | 2/2015 | Neuhauser ............. G06V 20/62 707/758 |
| 2020/0074216 A1 | 3/2020 | Zheng |
| 2021/0295532 A1* | 9/2021 | Lee ........................... G06T 7/73 |

FOREIGN PATENT DOCUMENTS

| CN | 109815931 A | 5/2019 |
| CN | 110033000 A | 7/2019 |

(Continued)

OTHER PUBLICATIONS

Extended European Search Report for European Application No. 21180877.9, dated Dec. 8, 2021, 9 pages.
(Continued)

*Primary Examiner* — Akwasi M Sarpong
*Assistant Examiner* — Michael L Burleson
(74) *Attorney, Agent, or Firm* — Seed IP Law Group LLP

(57) ABSTRACT

A method and apparatus for processing an image, a device and a storage medium are provided. An implementation of the method includes: acquiring a template image, the template image including at least one region of interest; determining a first feature map corresponding to each region of interest in the template image; acquiring a target image; determining a second feature map of the target image; and determining at least one region of interest in the target image according to the first feature map and the second feature map.

17 Claims, 6 Drawing Sheets

(51) Int. Cl.
*G06T 7/11* (2017.01)
*G06F 18/213* (2023.01)
*G06V 30/146* (2022.01)
*G06V 30/18* (2022.01)
*G06V 10/764* (2022.01)
*G06V 10/82* (2022.01)
*G06V 30/10* (2022.01)

(52) U.S. Cl.
CPC ............ *G06T 7/136* (2017.01); *G06V 10/764* (2022.01); *G06V 10/82* (2022.01); *G06V 30/147* (2022.01); *G06V 30/18057* (2022.01); *G06T 2207/30176* (2013.01); *G06V 30/10* (2022.01)

(58) Field of Classification Search
CPC .......... G06N 3/045; G06N 3/08; G06V 10/22; G06V 10/25; G06V 10/44
See application file for complete search history.

(56) References Cited

FOREIGN PATENT DOCUMENTS

| | | |
|---|---|---|
| CN | 110245664 A | 9/2019 |
| CN | 111209903 A | 5/2020 |
| CN | 111429456 A | 7/2020 |
| CN | 111782977 A | 10/2020 |
| CN | 111931771 A | 11/2020 |

OTHER PUBLICATIONS

Tang et al., "A deep learning model for recognizing structured texts in images," Journal of Hangzhou Dianzi University (Natural Sciences), vol. 40, No. 2, Mar. 2020, 7 pages.

* cited by examiner

METHOD AND APPARATUS FOR PROCESSING IMAGE, DEVICE AND STORAGE MEDIUM

CROSS-REFERENCE TO RELATED APPLICATIONS

This application claims priority to Chinese Patent Application No. 202011526687.4, filed with the China National Intellectual Property Administration (CNIPA) on Dec. 22, 2020, the content of which is incorporated herein by reference in its entirety.

TECHNICAL FIELD

The present disclosure relates to the field of computer technology, particularly to the field of computer vision technology and deep learning technology, and more particularly to a method and apparatus for processing an image, a device and a storage medium.

BACKGROUND

OCR has received extensive attention and is widely applied in all walks of life such as education, finance, medical care, transportation, and insurance. However, simple image and text detection and recognition capabilities cannot satisfy the direct use requirement of a user or back-end software. Generally, semantically structured field definition output is more required, for example, contents of a name field, an address field and a card number field on an identity card. A mainstream detection or end-to-end method in the industry cannot explicitly and universally solve the detection of a field to which the user pays attention. Moreover, a complex post-processing or highly customized detection model is usually required to solve the detection problem. For example, for an identity card (requiring 6 fields: a name field, a gender field, a date of birth field, a place of birth field, an identity card number field, and an effective date field), it is necessary to separately train a detection model supporting a classification for categories of the 6 fields for processing. For another image of a vertical category (e.g. a driver license), a number of required fields is different (e.g., 10), and thus, a structured output of the detection model needs to be modified.

SUMMARY

A method and apparatus for processing an image, a device and a storage medium are provided.

According to the first aspect, some embodiments of the present disclosure provide a method for processing an image, the method includes: acquiring a template image, the template image including at least one region of interest; determining a first feature map corresponding to each region of interest in the template image; acquiring a target image; determining a second feature map of the target image; and determining at least one region of interest in the target image according to the first feature map and the second feature map.

According to a second aspect, some embodiments of the present disclosure provide an apparatus for processing an image, the apparatus includes: a first image acquiring unit, configured to acquire a template image, the template image including at least one region of interest; a first feature map determining unit, configured to determine a first feature map corresponding to each region of interest in the template image; a second image acquiring unit, configured to acquire a target image; a second feature map determining unit, configured to determine a second feature map of the target image; and a region of interest positioning unit, configured to determine at least one region of interest in the target image according to the first feature map and the second feature map.

According to a third aspect, some embodiments of the present disclosure provide an electronic device for processing an image, the electronic device includes: at least one computation unit; and a storage unit, communicated with the at least one computation unit, where the storage unit stores an instruction executable by the at least one computation unit, and the instruction is executed by the at least one computation unit, to enable the at least one computation unit to perform the method according to the first aspect.

According to a fourth aspect, some embodiments of the present disclosure provide a non-transitory computer readable storage medium, storing a computer instruction, wherein the computer instruction, when executed by a processor, cause the processor to perform the method according to the first aspect.

According to a fifth aspect, some embodiments of the present disclosure provide a computer program product, comprising a computer program, wherein the computer program, when executed by a computation unit, cause the computation unit to implement the method according to the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that embodiments in the present disclosure and the features in the embodiments may be combined with each other on a non-conflict basis.

Embodiments of the present disclosure will be described below in detail with reference to the accompanying drawings.

Figure 1:
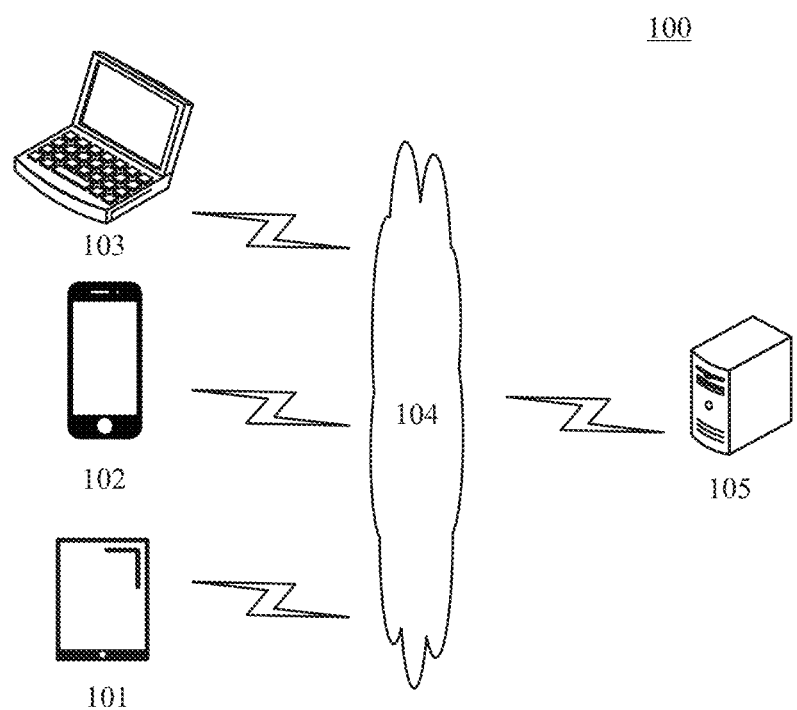
FIG. 1 is a diagram of an exemplary system architecture in which an embodiment of the present disclosure may be applied.

FIG. 1 illustrates an exemplary system architecture 100 in which a method for processing an image or an apparatus for processing an image may be applied.

As shown in FIG. 1, the system architecture 100 may include terminal device(s) 101, 102 and/or 103, a network 104 and a server 105. The network 104 serves as a medium providing a communication link between the terminal device(s) 101, 102 and/or 103 and the server 105. The network 104 may include various types of connections, for example, wired or wireless communication links, or optical fiber cables.

A user may use the terminal device(s) 101, 102 and/or 103 to interact with the server 105 via the network 104 to receive or send a message, the like. Various communication client applications (e.g., an image collection application, and an image processing application) may be installed on the terminal device(s) 101, 102 and/or 103.

The terminal device(s) 101, 102 and/or 103 may be hardware or software. When being the hardware, the terminal device(s) 101, 102 and/or 103 may be various electronic devices, the electronic devices including, but not limited to, a smartphone, a tablet computer, a vehicle-mounted computer, a laptop portable computer, a desktop computer, and the like. When being the software, the terminal device(s) 101, 102 and/or 103 may be installed in the above listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various services. For example, the server 105 may be a backend server processing an image provided by the terminal device(s) 101, 102 and/or 103. The backend server may process the obtained image by using various image processing models, and feed back an image processing result to the terminal device(s) 101, 102 and/or 103.

It should be noted that the server 105 may be hardware or software. When being the hardware, the server 105 may be implemented as a distributed server cluster composed of a plurality of servers, or may be implemented as a single server. When being the software, the server 105 may be implemented as a plurality of pieces of software or a plurality of software modules (e.g., software or software modules for providing a distributed service), or may be implemented as a single piece of software or a single software module, which will not be specifically defined here.

It should be noted that the method for processing an image provided in embodiments of the present disclosure may be performed by the terminal device(s) 101, 102 and/or 103, or may be performed by the server 105. Correspondingly, the apparatus for processing an image may be provided in the terminal device(s) 101, 102 and/or 103, or may be provided in the server 105.

It should be appreciated that the numbers of the terminal devices, the networks, and the servers in FIG. 1 are merely illustrative. Any number of terminal devices, networks, and servers may be provided based on actual requirements.

Figure 2:
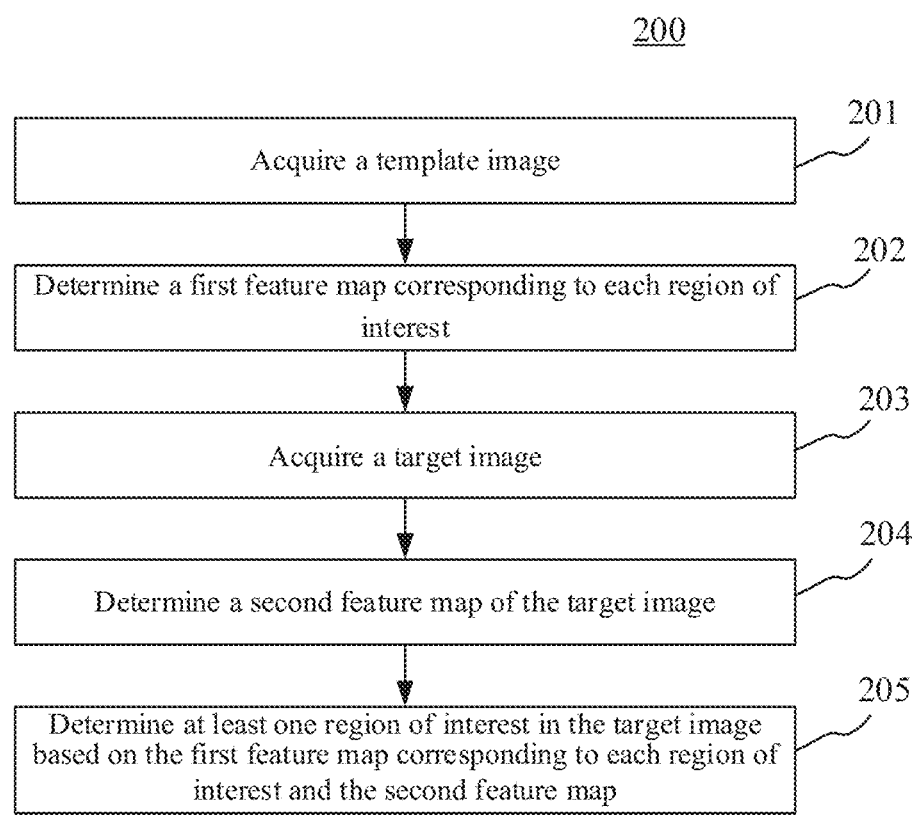
FIG. 2 is a flowchart of a method for processing an image according to an embodiment of the present disclosure.

Further referring to FIG. 2, FIG. 2 illustrates a flow 200 of a method for processing an image according to an embodiment of the present disclosure. The method for processing an image in this embodiment includes the following steps:

Step 201, acquiring a template image.

In this embodiment, an executing body (e.g., the terminal device 101, 102 or 103 or the server 105 shown in FIG. 1) of the method for processing an image may acquire the template image by various means. The template image may refer to an image having a template or having specific format or layout, for example, may be an image of an identity card, an image of an exam admission ticket, or an image of a driver license. The template image may include a plurality of regions of interest, and the regions of interest may be set by a user. The user may set a rectangular box on the template image to mark the above regions of interest. A region of interest may refer to various kinds of regions on the template image, for example, may be a name region in the image of an identity card.

Step 202, determining a first feature map corresponding to a region of interest.

The executing body may determine a first feature map corresponding to a region of interest on the template image. Particularly, the executing body may perform a feature extraction on a region of interest to obtain the first feature map corresponding to the region of interest. Alternatively, the executing body may first perform the feature extraction on the template image to obtain a feature map, and then perform an interception on the feature map of the template image by using the rectangular box of a region of interest, to obtain the first feature map corresponding to region of interest.

Step 203, acquiring a target image.

The executing body may further acquire the target image by various means. The target image may be an image on which a region of interest is to be detected. The target image and the template image may include same field, for example, may both be an image of an identity card or an image of a driver license.

Step 204, determining a second feature map of the target image.

The executing body may further perform a feature extraction on the target image to obtain the second feature map of the target image. Particularly, the executing body may perform the feature extraction on the target image by using various feature extraction algorithms.

Step 205, determining at least one region of interest in the target image according to the first feature map and the second feature map.

After obtaining the first feature map(s) of the region(s) of interest and the second feature map, the executing body may determine the at least one region of interest in the target image. Particularly, the executing body may partition the second feature map according to the rectangular box(es) of the region(s) of interest in the template image, to obtain a plurality of feature sub-maps having sizes that are the same as those of the rectangular box(es). Then, a similarity between each of the feature sub-maps and a single first feature map is calculated respectively. A region corresponding to a feature sub-map having a maximum similarity is used as a region of interest.

Figure 3:
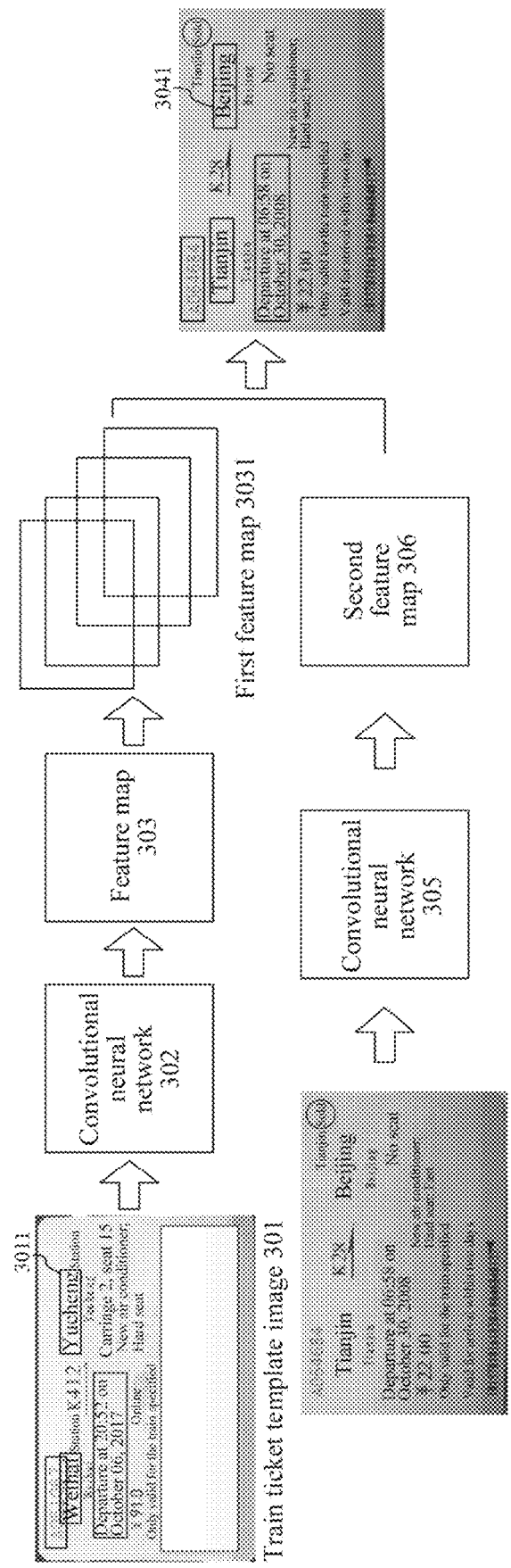
FIG. 3 is a schematic diagram of an application scenario of the method for processing an image according to an embodiment of the present disclosure.

Further referring to FIG. 3, FIG. 3 is a schematic diagram of an application scenario of the method for processing an image according to an embodiment of the present disclosure.

In the application scenario of FIG. 3, a user marks four regions of interest 3011 in a train ticket template image 301. Each region of interest 3011 is marked by a rectangular box. The train ticket template image 301 is inputted into a convolutional neural network 302 to obtain a feature map 303 of the train ticket template image 301. In combination with the rectangular boxes, the first feature maps 3031 corresponding to the regions of interest 3011 are obtained. Then, a target train ticket image 304 is inputted into a convolutional neural network 305 to obtain a second feature map 306 of the target train ticket image 304. Finally, the region of interest 3041 in the target train ticket image 304 is determined according to the first feature maps 3031 and the second feature map 306. It may be appreciated that if the user wants to detect another field in the train ticket image, the user may mark the another field by setting another rectangular box in the train ticket template image 301.

According to the method for processing an image provided in the above embodiment of the present disclosure, an image of a text having any number of fields and belonging to any vertical category may be detected, and thus, customization requirements of the user can be satisfied.

Figure 4:
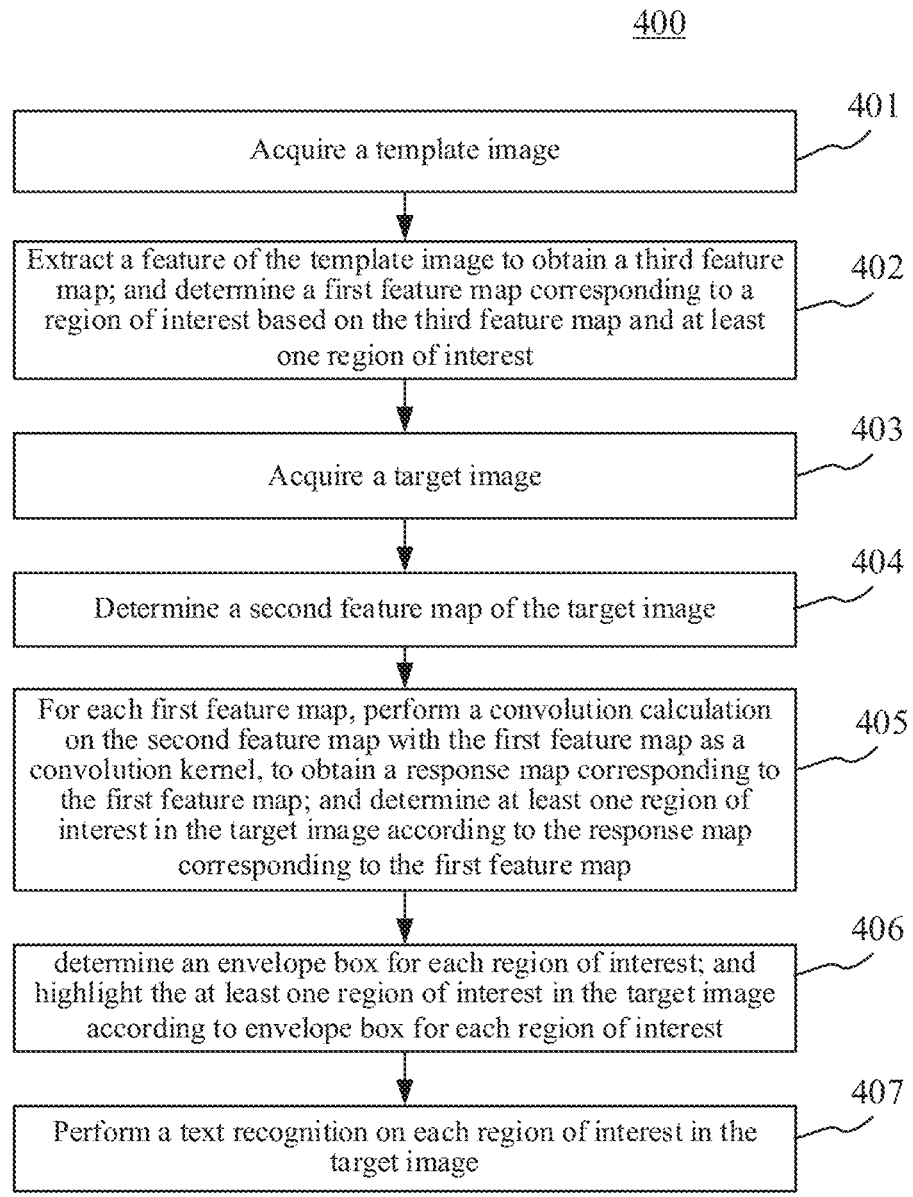
FIG. 4 is a flowchart of a method for processing an image according to another embodiment of the present disclosure.

Further referring to FIG. 4, FIG. 4 illustrates a flow 400 of a method for processing an image according to an embodiment of the present disclosure. As shown in FIG. 4, the method in this embodiment includes the following steps:

Step 401, acquiring a template image.

Step 402, extracting a feature of the template image to obtain a third feature map; and determining a first feature map corresponding to a region of interest based on the third feature map and at least one region of interest.

In this embodiment, the executing body may first extract the feature of the template image to obtain the third feature map. Here, the executing body may extract the feature of the template image through a plurality of feature extraction algorithms. The obtained third feature map may include a global feature and a local feature of the template image. The executing body may determine the first feature map(s) corresponding to the region(s) of interest based on the third feature map and the region(s) of interest. Particularly, for each region of interest, the executing body may partition the third feature map according to the region of interest, to obtain a plurality of feature sub-maps, and then, select a feature sub-map from the plurality of feature sub-maps to be used as the first feature map corresponding to the region of interest.

In some alternative implementations of this embodiment, the executing body may determine the first feature map(s) corresponding to the region(s) of interest through the following steps not shown in FIG. 4: performing an interception on the third feature map by using the a region of interest, to obtain an interception feature map corresponding to the region of interest; and performing at least one of a convolution operation or a scaling operation on the interception feature map, to obtain the first feature map corresponding to the region of interest.

In this embodiment, the executing body may perform the interception on the third feature map by using the each region of interest, to obtain the interception feature map corresponding to the each region of interest. Particularly, the executing body may perform the interception on the third feature map according to a positional parameter (e.g., (x, y, w, h)) of the rectangular box of a region of interest. Here, x and y represent coordinates of a corner point of the rectangular box, w represents a width of the rectangular box, h represents a height of the rectangular box, and the obtained interception feature map is of the same size as the region of interest. Then, the executing body may perform the convolution operation and/or the scaling operation on obtained interception feature map, to obtain the first feature map corresponding to the region of interest. Moreover, the size of each first feature map satisfies a preset condition. For example, the preset condition is 128*3*3.

Step 403, acquiring a target image.

Step 404, determining a second feature map of the target image.

Step 405, for each first feature map, with the first feature map as a convolution kernel, performing a convolution calculation on the second feature map to obtain a response map corresponding to the first feature map; and determining at least one region of interest in the target image according to the response map corresponding to the first feature map.

In this embodiment, after obtaining the first feature map(s) corresponding to the region(s) of interest, the executing body may perform the convolution calculation on the second feature map with each first feature map as the convolution kernel, to obtain the response map corresponding to each first feature map. The executing body may implement the convolution computation through a convolution layer in the convolutional neural network, and may obtain a response map by setting an active layer succeeding the convolution layer. It may be appreciated that the values of the pixels in the response map are all fall within the range 0-1. The executing body may determine the at least one region of interest in the target image according to the response map corresponding to the each first feature map. Particularly, the executing body may use a pixel point in the response map that has a pixel value greater than a preset threshold value as a candidate pixel point. Then, screening is performed on the candidate pixel points to obtain a region of interest.

In some alternative implementations of this embodiment, the executing body may determine a region of interest in the target image through the following step not shown in FIG. 4: performing a threshold-based segmentation and a connected component analysis on each response map to determine the region of interest.

In this embodiment, the executing body may perform the threshold-based segmentation and the connected component analysis on each of the response maps to determine the regions of interest. Here, the threshold-based segmentation refers to the segmentation for the pixel points in the response maps that have the pixel value greater than the preset threshold value, and then, the connected component analysis is performed on the segmented pixel points to obtain a relatively stable region in the response maps as the region of interest.

Step 406, determining an envelope box for each region of interest; and highlighting the at least one region of interest in the target image according to envelope box for each region of interest.

After determining the regions of interest, the executing body may determine an envelope box for each region of interest. The envelope box herein may be represented by a rectangular box. Then, the executing body may process the each envelope box to highlight the each region of interest. Particularly, the executing body may change the border color of the each envelope box or change the fill color of the each envelope box.

Step 407, performing a text recognition on each region of interest in the target image.

After determining the region(s) of interest in the target image, the executing body may further perform the text recognition on each region of interest to obtain each field in the target image. Particularly, the executing body may input the each region of interest into a pre-trained text recognition network, to implement the text recognition on the region of interest.

According to the method for processing an image provided in the above embodiment of the present disclosure, with the first feature map corresponding to the each region of interest as the convolution kernel, convolution computation is performed on the second feature map, thus implementing the positioning for a region of interest, and making the calculation amount small and the accuracy high. Meanwhile, the each positioned region of interest may be highlighted, which is convenient for the user to check the positioning effect. In addition, the text recognition may be performed on each region of interest to facilitate the subsequent processing for the image.

Figure 5:
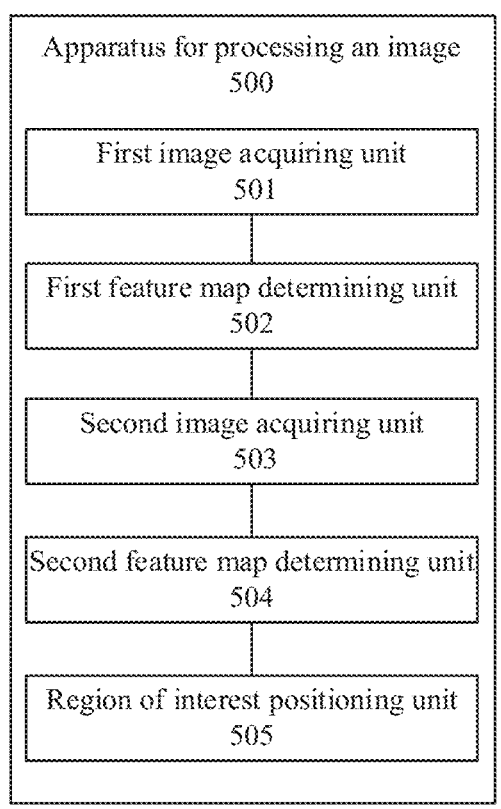
FIG. 5 is a schematic structural diagram of an apparatus for processing an image according to an embodiment of the present disclosure.

Further referring to FIG. 5, as an implementation of the method shown in the above drawings, an embodiment of the present disclosure provides an apparatus for processing an image. The embodiment of the apparatus corresponds to the embodiment of the method shown in FIG. 2, and the apparatus may be applied in various electronic devices.

As shown in FIG. 5, the apparatus 500 for processing an image in this embodiment includes: a first image acquiring unit 501, a first feature map determining unit 502, a second image acquiring unit 503, a second feature map determining unit 504, and a region of interest positioning unit 505.

The first image acquiring unit 501 is configured to acquire a template image, the template image including at least one region of interest.

The first feature map determining unit 502 is configured to determine a first feature map corresponding to each region of interest in the template image.

The second image acquiring unit 503 is configured to acquire a target image.

The second feature map determining unit 504 is configured to determine a second feature map of the target image.

The region of interest positioning unit 505 is configured to determine at least one region of interest in the target image according to the first feature map and the second feature map.

In some alternative implementations of this embodiment, the first feature map determining unit 502 may be further configured to: extract a feature of the template image to obtain a third feature map; and determine the first feature map corresponding to the each region of interest based on the third feature map and the at least one region of interest.

In some alternative implementations of this embodiment, the first feature map determining unit 502 may be further configured to: perform an interception on the third feature map by using the each region of interest, to obtain an interception feature map corresponding to the each region of interest; and perform at least one of a convolution operation or a scaling operation on the interception feature map, to obtain the first feature map corresponding to the each region of interest.

In some alternative implementations of this embodiment, the region of interest positioning unit 505 may be further configured to: for each first feature map, performing a convolution calculation on the second feature map with the each first feature map as a convolution kernel, to obtain a response map corresponding to the each first feature map; and determine the at least one region of interest in the target image according to the response map corresponding to the each first feature map.

In some alternative implementations of this embodiment, the region of interest positioning unit 505 may be further configured to: perform a threshold-based segmentation and a connected component analysis on the response map corresponding to the each first feature map, to determine the at least one region of interest in the target image.

In some alternative implementations of this embodiment, the apparatus 500 may further include a highlighting unit not shown in FIG. 5, and the highlighting unit is configured to: determine an envelope box for the each region of interest; and highlight the at least one region of interest in the target image according to the envelope box for the each region of interest.

In some alternative implementations of this embodiment, the apparatus 500 may further include a text recognition unit not shown in FIG. 5, and the text recognition unit is configured to: perform a text recognition on each region of interest in the target image.

It should be understood that the units 501-505 described in the apparatus 500 for processing an image correspond to the steps in the method described with reference to FIG. 2, respectively. Accordingly, the operations and features described above for the method for processing an image are also applicable to the apparatus 500 and the units included therein, and thus will not be repeatedly described here.

According to an embodiment of the present disclosure, an electronic device, a readable storage medium and a computer program product are provided.

Figure 6:
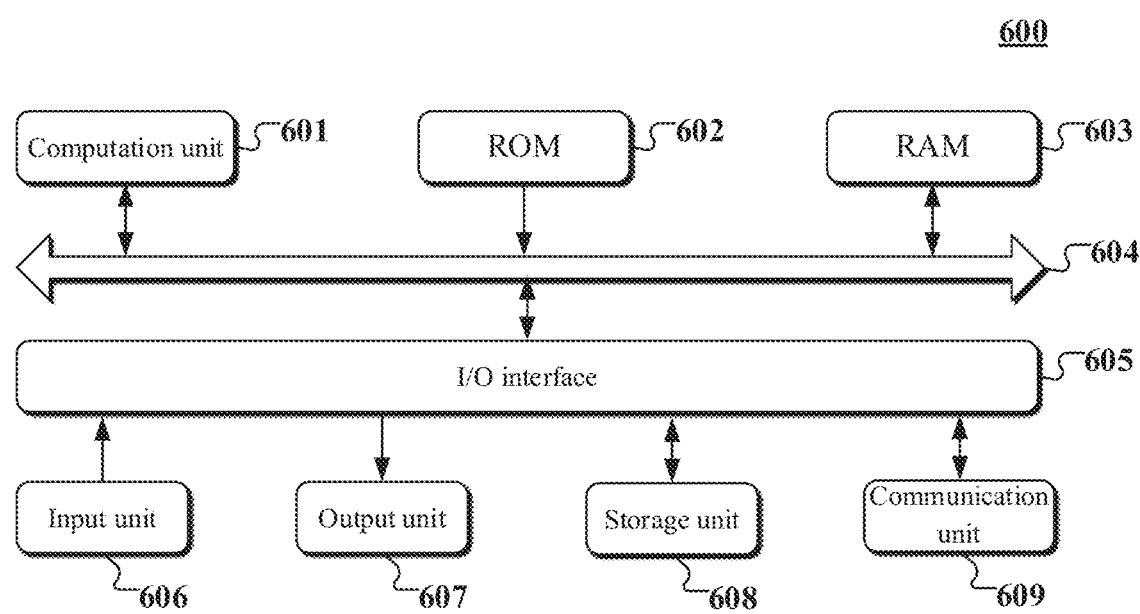
FIG. 6 is a block diagram of an electronic device used to implement a method for processing an image according to embodiments of the present disclosure.

As shown in FIG. 6, FIG. 6 is a block diagram of an electronic device performing the method for processing an image according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the device 600 includes a computation unit 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the device 600. The computation unit 601, the ROM 602 and the RAM 603 are connected to each other through a bus 604. An input/output (I/O) interface 605 is also connected to the bus 604.

A plurality of components in the device 600 are connected to the I/O interface 605, including: an input unit 606, for example, a keyboard and a mouse; an output unit 607, for example, various types of displays and speakers; the storage unit 608, for example, a disk and an optical disk; and a communication unit 609, for example, a network card, a modem, or a wireless communication transceiver. The communication unit 609 allows the device 600 to exchange information/data with other devices over a computer network such as the Internet and/or various telecommunication networks.

The computing unit 601 may be various general-purpose and/or dedicated processing components having processing and computing capabilities. Some examples of the computing unit 601 include, but are not limited to, central processing unit (CPU), graphics processing unit (GPU), various dedicated artificial intelligence (AI) computing chips, various computing units running machine learning model algorithms, digital signal processor (DSP), and any appropriate processors, controllers, microcontrollers, etc. The computing unit 601 performs the various methods and processes described above, such as the method for processing an image. For example, in some embodiments, the method for processing an image may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the computing unit 601, one or more steps of the method for processing an image described above may be performed. Alternatively, in other embodiments, the computing unit 601 may be configured to perform the method for processing an image by any other appropriate means (for example, by means of firmware).

Various embodiments of the systems and technologies described herein may be implemented in digital electronic circuit systems, integrated circuit systems, dedicated ASICs (application specific integrated circuits), ASSP (application specific standard product), SOC (System of systems on a chip), CPLD (Load programmable logic devices), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

The program code used to implement the method for processing an image according to embodiments of the present disclosure may be written in one programming language or in any combination of more programming languages. The above program code may be packaged into a computer program product. These program code or computer program product may be supplied to the processor or controller of a general-purpose computer, a dedicated computer, or other programmable data processing device, so that the program code, when executed by computation unit 601, enables the function/operation specified in the flow charts and/or block diagrams to be performed. The program code may be completely executed on a user's computer, partially executed on a user's computer, executed as a separate software package, partially executed on a user's computer and partially executed on a remote computer, or completely executed on a remote computer or server.

In the context of the present disclosure, the machine-readable medium may be a tangible medium that may contain or store a program intended for use with or in combination with an instruction execution system, device, or equipment. The machine-readable medium can be a machine-readable signal medium or a machine-readable storage medium. Machine readable media may include, but are not limited to, electronic, magnetic, optical, electromagnetic, infrared, or semiconductor systems, devices or equipment, or any appropriate combination of the foregoing. More concrete examples of the machine-readable storage medium may include the electrical connection based on one or more wires, portable computer disk, hard disk, random access memory (RAM), read-only memory (ROM), erasable and programmable read-only memory (EPROM or flash memory), optical fiber, convenient type compact disk read only memory (CD-ROM), optical storage devices, magnetic storage device, or any appropriate combination of the foregoing.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other. The server can be a cloud server, also known as cloud computing server or cloud host, is a host product in the cloud computing service system, to solve defects in the traditional physical host and VPS service ("Virtual Private Server", or referred to as "VPS"), such as larger difficulty in management, weak business scalability.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for processing an image, comprising:
   acquiring a template image, the template image including at least one region of interest;
   determining a first feature map corresponding to each region of interest in the template image, wherein determining the first feature map corresponding to each region of interest comprises: extracting a feature of the template image to obtain a third feature map, and determining the first feature map corresponding to the to the each region of interest based on the third feature map and the at feast one region of interest;
   acquiring a target image;
   determining a second feature map of the target image; and
   determining at least one region of interest in the target image according to the first feature map and the second feature map.

2. The method according to claim 1, wherein the determining the first feature map corresponding to the each region of interest based on the third feature map and the at least one region of interest comprises:
   performing an interception on the third feature map by using the each region of interest, to obtain an interception feature map corresponding to the each region of interest; and
   performing at least one of a convolution operation or a scaling operation on the interception feature map, to obtain the first feature map corresponding to the each region of interest.

3. The method according to claim 1, wherein the determining the at least one region of interest in the target image based on the first feature map and the second feature map comprises:
   for each first feature map, performing a convolution calculation on the second feature map with the each first feature map as a convolution kernel, to obtain a response map corresponding to the each first feature map; and
   determining the at least one region of interest in the target image according to the response map corresponding to the each first feature map.

4. The method according to claim 3, wherein the determining the at least one region of interest in the target image according to the response map corresponding to the each first feature map comprises:
   performing a threshold-based segmentation and a connected component analysis on the response map corresponding to the each first feature map, to determine the at least one region of interest in the target image.

5. The method according to claim 1, further comprising:
   determining an envelope box for the each region of interest; and
   highlighting the at least one region of interest in the target image according to the envelope box for the each region of interest.

6. The method according to claim 1, further comprising:
   performing a text recognition on each of the determined at least one region of interest in the target image.

7. An electronic device for processing an image, comprising:
   at least one computation unit; and
   a storage unit, communicated with the at least one computation unit,
   wherein the storage unit stores an instruction executable by the at least one computation unit, and the instruction is executed by the at least one computation unit, to enable the at least one computation unit to perform operations, the operations comprising:
   acquiring a template image, the template image including at least one region of interest;
   determining a first feature map corresponding to each region of interest in the template image, determining the first feature map corresponding to each region of interest comprises: extracting a feature of the template image to obtain a third feature map, and determining the first feature map corresponding to the each region of interest based on the third feature map and the at least one region of interest;
   acquiring a target image;
   determining a second feature map of the target image; and
   determining at least one region of interest in the target image according to the first feature map and the second feature map.

8. The electronic device according to claim 7, wherein the determining the first feature map corresponding to the each region of interest based on the third feature map and the at least one region of interest comprises:
   performing an interception on the third feature map by using the each region of interest, to obtain an interception feature map corresponding to the each region of interest; and
   performing at least one of a convolution operation or a scaling operation on the interception feature map, to obtain the first feature map corresponding to the each region of interest.

9. The electronic device according to claim 7, wherein the determining the at least one region of interest in the target image based on the first feature map and the second feature map comprises:
   for each first feature map, performing a convolution calculation on the second feature map with the each first feature map as a convolution kernel, to obtain a response map corresponding to the each first feature map; and
   determining the at least one region of interest in the target image according to the response map corresponding to the each first feature map.

10. The electronic device according to claim 9, wherein the determining the at least one region of interest in the target image according to the response map corresponding to the each first feature map comprises:
    performing a threshold-based segmentation and a connected component analysis on the response map corresponding to the each first feature map, to determine the at least one region of interest in the target image.

11. The electronic device according to claim 7, wherein the operations further comprise:
    determining an envelope box for the each region of interest; and
    highlighting the at least one region of interest in the target image according to the envelope box for the each region of interest.

12. The electronic device according to claim 7, wherein the operations further comprise:
    performing a text recognition on each of the determined at least one region of interest in the target image.

13. A non-transitory computer readable storage medium, storing a computer instruction, wherein the computer instruction, when executed by a processor, cause the processor to perform operations, the operations comprising:
    acquiring a template image, the template image including at least one region of interest;

determining a first feature map corresponding to each region of interest in the template image, wherein determining the first feature map comes corresponding to each region of interest comprises: extracting a feature of the template image to obtain a third feature map, and determining the first feature map corresponding to the each region of interest based on the third feature map and the at least one region of interest;

acquiring a target image;

determining a second feature map of the target image; and determining at least one region of interest in the target image according to the first feature map and the second feature map.

14. The medium according to claim 13, wherein the determining the first feature map corresponding to the each region of interest based on the third feature map and the at least one region of interest comprises:

performing an interception on the third feature map by using the each region of interest, to obtain an interception feature map corresponding to the each region of interest; and performing at least one of a convolution operation or a scaling operation on the interception feature map, to obtain the first feature map corresponding to the each region of interest.

15. The medium according to claim 13, wherein the determining the at least one region of interest in the target image based on the first feature map and the second feature map comprises:

for each first feature map, performing a convolution calculation on the second feature map with the each first feature map as a convolution kernel, to obtain a response map corresponding to the each first feature map; and determining the at least one region of interest in the target image according to the response map corresponding to the each first feature map.

16. The medium according to claim 15, wherein the determining the at least one region of interest in the target image according to the response map corresponding to the each first feature map comprises:

performing a threshold-based segmentation and a connected component analysis on the response map corresponding to the each first feature map, to determine the at least one region of interest in the target image.

17. The medium according to claim 13, wherein the operations further comprise:

determining an envelope box for the each region of interest; and highlighting the at least one region of interest in the target image according to the envelope box for the each region of interest.

* * * * *